United States Patent [19]

Robbins et al.

[11] Patent Number: 4,539,572

[45] Date of Patent: Sep. 3, 1985

[54] OPTICAL RECORDING MEDIUM

[75] Inventors: William B. Robbins, Maplewood, Minn.; Richard F. Willson, Hudson, Wis.; Robert P. Freese, Lake Elmo, Minn.

[73] Assignee: Minnesota Mining and Manufacturing Company, St. Paul, Minn.

[21] Appl. No.: 466,436

[22] Filed: Feb. 15, 1983

Related U.S. Application Data

[63] Continuation-in-part of Ser. No. 234,111, Feb. 13, 1981, Pat. No. 4,430,659.

[51] Int. Cl.³ .................................................. G01D 15/34
[52] U.S. Cl. ................................. 346/135.1; 346/76 L; 369/284; 430/945
[58] Field of Search .................. 346/135.1, 137, 76 L; 369/84, 100, 113, 284; 430/945

[56] References Cited

U.S. PATENT DOCUMENTS

| 3,716,844 | 2/1973 | Brodsky | 346/135.1 |
| 4,285,056 | 8/1981 | Bell | 346/135.1 X |
| 4,335,198 | 6/1982 | Hanada | 346/135.1 X |
| 4,379,299 | 4/1983 | Fitzpatrick | 346/135.1 X |
| 4,430,659 | 2/1984 | Maffitt | 346/135.1 |
| 4,433,340 | 2/1984 | Mashita | 346/135.1 |
| 4,470,053 | 9/1984 | Maffitt | 346/135.1 |

OTHER PUBLICATIONS

Laser-Created Bubbles Proposed for Archival Optical Data Storage, Laser Focus, Jun. 1981.
Robbins et al., Bubble Forming Media for Optical Recording; CLEO 1981, Washington, D.C., Jun. 11, 1981.

Primary Examiner—Joseph W. Hartary
Attorney, Agent, or Firm—Donald M. Sell; James A. Smith; William B. Barte

[57] ABSTRACT

An optical recording medium containing a light-absorbing film of refractory material less than 60 nm thick and selected from carbides of Al, Hf, Nb, Ta, Ti, V, W, and Zr and alloys herebetween, whereupon localized heating of the light-absorbing film enables information storage in the form of localized features in the heated areas which can subsequently be optically detected and can be used as a master information record for replication purposes.

19 Claims, 4 Drawing Figures

OPTICAL RECORDING MEDIUM

DESCRIPTION

Related Applications

This application is a continuation-in-part of U.S. Ser. No. 234,111, filed Feb. 13, 1981 now U.S. Pat. No. 4,430,659.

Technical Field

This invention relates to a recording system in which information is to be optically recorded with a focused laser on a medium containing a radiation absorbing film, and in particular to such a system wherein no development of the recording medium is necessary after exposure such that the medium is available for playback immediately after exposure, i.e. direct-read-after-write.

Background Art

While optical recording, i.e. the recording and playback of information using a focused beam of light, was first proposed long ago, it required the development of low cost, practical lasers to make such a concept a commercial reality. Today, vast sums have been and are being invested in research and development aimed at developing more sensitive media, media having higher resolution, systems having improved capabilities of coping with physical irregularities, etc. A useful review of what may reflect the state-of-the-art in many competing media for optical recording is presented in the article "Optical Disk Systems Emerge", by R. A. Bartolini et al, IEEE Spectrum, Vol. 15, No. 8, pages 20–28, August 1978, at page 22, of which is set forth a table comparing various candidate materials and media. A particularly desirable media which bears certain similarities to the present invention is discussed at page 26 thereof. The medium there discussed includes a thin layer of metal such as titanium, which upon impact of a laser beam, melts (the melting point of Ti is 1668° C.) to form a crater pit; thus allowing a reflectorized layer therebelow to become visible.

Optical recording media utilizing thin metallic films which form pits upon recording are further discussed in the article "Optical Recording with the Encapsulated Titanium Trilayer", by A. E. Bell et al, RCA Review, Vol. 40, pages 345–362, September, 1979. That article notes that dust particles tend to degrade the media after fabrication, and proposes that the media be encapsulated with a silicone rubber formulation (such as G.E. RTV 615B) to protect the surface. However, due to the high temperature present at which the Ti layer melts to form the crater pits, it is further said to be necessary to thermally isolate the protective overcoat by providing a silicon dioxide thermal barrier layer between the Ti absorber layer, and the overcoat. At page 359 the authors report on recordings made after deposition of the silicon dioxide overcoat thermal barrier layer, but prior to application of the RTV coating, and observed that "some distortion of the silicon dioxide layer has occurred, resulting in the formation of raised bubbles in the regions where the titanium layer has been melted."

A further mention of the formation of domes in the process of melting a thin metallic film upon laser impingement to form holes for digital data storage is found in the article "Melting Holes in Metal Films for Real-Time, High-Density, Permanent Digital Data Storage", by Messrs. John Corcoran and Herman Ferrier, Proceedings of the Society of Photo-Optical Instrumentation Engineers, Vol. 123, pages 17–31. At page 19 thereof are reported results obtained upon laser impingement on experimental media constructed of a substrate of glass on which an 80 nm thin film of chromium was deposited and on top of which was a layer of collodion (a viscous solution of pyroxylin, a cellulose nitrate mixture). When a laser beam limited in intensity to a point where resultant holes could not be detected optically was directed onto the Cr film, dimples in the outer surface were detected upon SEM examination. When the collodion layer was stripped off and the Cr layer alone exposed as before, domes having a radius of approximately one micrometer were detected via scanning electron microscopy. The authors postulated that both the dimples and domes resulted from gaseous decomposition products formed when the Cr film melted, and which, given slightly more energy, would produce holes.

The use of thin metal or metal-like films in direct-read-after-write recording media in which the films are caused to melt or ablate to form holes or pits likewise is disclosed in numerous patents. See, for example, U.S. Pat. Nos. 3,560,994 (Wolff & Hanisch), 3,720,784 (Maydan et al), 3,787,873 (Sato), 3,889,272 (Lou), 3,911,444 (Lou), 4,000,492 (Willens), 4,023,185 (Bloom et al), 4,069,487 (Kasai et al), 4,097,895 (Spong), 4,101,907 (Bell and Bartolini), 4,137,077 (Credelle et al), 4,139,853 (Ghekiere et al), 4,141,731 (Jarsen), 4,176,377 (Howe), 4,188,214 (Kido et al), 4,189,735 (Bell et al), 4,195,312 (Bell et al), 4,195,313 (Bell et al.), 4,211,617 (Hunyar), 4,216,501 (Bell), and UK Pat. No. 1,571,948 (Thomson-Brandt).

These patents are primarily directed to media which include light-absorbing films of low melting point metals such as Bi, Pb and Sn, and those of moderate melting point metals such as Ti, but in which refractory materials would normally be undesirable, since the amount of energy required to melt the material and to form the pits or craters, i.e. the recording threshold, would be excessively high, thus resulting in a recording medium with a lower equivalent sensitivity, assuming that all other parameters in the media were the same, i.e. that the respective media likewise include or do not include such sensitivity affecting elements as light reflecting underlayers, antireflecting overlayers, interferometric dimensions to optimize absorption and/or reflection, etc.

Of the above listed patents, U.S. Pat. No. 4,069,487 (Kasai et al) is particularly relevant to the present invention, as it suggests that the recording layer in which pits or holes are to be formed by vaporization and/or melting is composed of a non-metallic material which absorbs the laser beam efficiently. Representative non-metallic materials are said to include inorganic oxides, chalcogen compounds and resins, relatively high sensitivity materials being suggested to include lead oxide, tungsten oxide, titanium oxide, silicon oxide, zirconium oxide, and the like. The melting points of these oxides are believed to be approximately 1160 K, 1740 K, 2110 K, 1980 K and 2970 K, respectively, such that some of them may be said to be a refractory material as defined below. Such oxides are said to be useable alone as the light-absorbing layer, as in Example 4 thereof, wherein a 300 nm layer of $WO_3$ was deposited, as well as when laminated with a metallic layer, as in Example 4, wherein a 60 nm thick layer of $TiO_2$ was deposited on top of 100 nm thick layer of Au. The pertinent figures of that reference depict holes or pits formed during recording as extending through such laminate constructions to expose the support therebelow.

Optical recording media which include oxygen deficient oxides of Ti, Fe, Cr, Mn, Pb, and Zr are disclosed in UK Pat. No. 1,571,948, wherein recording under a laser beam is said to produce localized changes in the index of refraction. Certain of those oxides may likewise be considered to be refractory.

Although the various media discussed above are effective for use with argon laser and helium/neon laser recording systems, they are not as satisfactory for recording systems based on a laser diode which is the currently preferred light source, being much less expensive, having low power requirements, and providing very fast modulation speeds. Laser diodes typically emit recording wavelengths within the range of 700 to 900 nm.

Whatever the laser and whether or not features produced upon laser recording are pits or bubbles, the ultimate objective is to create features such that when the recorded information is played back, the reproduced signals are essentially identical to the recorded signals, as evidenced by high signal-to-noise or carrier-to-noise ratios.

Disclosure of Invention

The optical recording medium of the present invention includes a substrate and a light absorbing layer for absorbing light from the laser beam in localized regions to form optically discernable features thereat and thereby provide information storage. In particular, the light absorbing layer comprises a refractory material having a thickness in the range between 1 and 60 nm, which material is selected from the group consisting of carbides of Al, Hf, Nb, Ta, Ti, V, W and Zr. In one embodiment, the carbide layer is selected to have a plasticity sufficient to allow plastic deformation upon localized heating resulting from impingement by a focused laser beam to enable the formation of localized features shaped as protuberances which subsequently can be optically detected. Upon more intense exposure or with less plastic layers, optically detectable features in the form of pits or holes may also be formed.

A high carrier-to-noise ratio has thus been found to be characteristic of the media of the present invention. This result is particularly believed due to the uniformly varying profile of features shaped as protuberances.

In one preferred embodiment, the medium includes a reflecting layer between the substrate and the light-absorbing layer, wherein the total optical thickness of the absorbing layer is such as to result in an interferometric, substantially antireflecting structure when in the undeformed state, and wherein subsequently formed features in the shape of bubbles or protuberances possess appreciably increased effective optical thickness. Such a reflecting layer may, for example, be a thin film of Al, Cr, Cu, Au, Ag, stainless steels or Ti.

In another embodiment, an optical spacer layer may be provided below the light-absorbing layer, and which in combination therewith provides an interferometric antireflecting structure. Preferably, however, such a spacer layer is sandwiched between a reflector layer and the light-absorbing layer to form an efficient light-absorbing trilayered structure which exhibits optimum sensitivity. Such a structure is, for example, desirably formed to exhibit multiple-interferometric orders.

A particularly desirable aspect of the present invention is that when the features representing information are protuberances, such features possess appreciable height, and thus form an information record which is both directly optically detectable, thereby enabling the use of the record in direct-read-after-write applications, and which is also usable as a master record from which replicas may be directly formed. In a further process, such replicas may be formed by thereafter placing the surface containing the protuberances in contact with a polymeric material or precursor thereof to form replicas of said protuberant pattern on a surface of the polymeric material.

Description of the Preferred Embodiments

Figure 1:
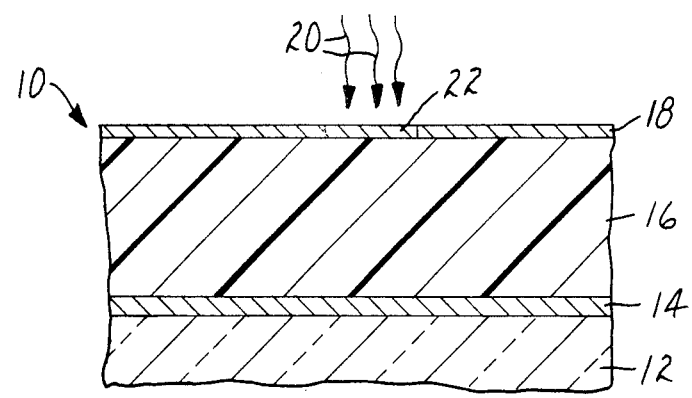
FIG. 1 is a cross-section of one embodiment of a recording medium of the present invention.

Referring to FIG. 1, it may be seen that a recording medium 10 according to a preferred embodiment includes a substrate 12 upon which is deposited a reflecting layer 14 and thereover an optical spacer 16, on top of which is deposited a light-absorbing layer 18. A laser beam 20 is applied to the recording medium modulated in accordance with the information to be recorded thereon. Depending upon the selected carbide layer and intensity and duration of the laser beam exposure, the irradiated portion 22 may become deformed to form protuberances representative of the recorded information, or may be removed to form pits.

In various embodiments of the present invention, the thicknesses of the various layers may vary over considerable ranges. Thus, for example, in FIG. 1, the reflecting layer 14 is shown to be relatively thin, for example, a layer of evaporated aluminum, approximately 30 nm thick, while the optical spacer layer 16 is appreciably thicker, for example, a layer of an acrylate polymer approximately 250 nm thick, and the light-absorbing layer 18, is also relatively thin, for example, a deposited film of hafnium carbide, approximately 8.5 nm thick.

Figure 2:
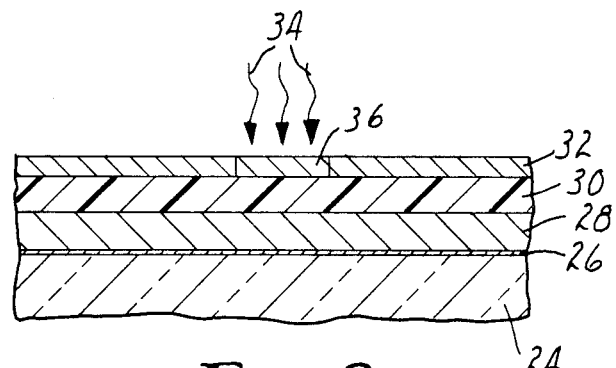
FIG. 2 is a cross-section of another embodiment of a recording medium of the present invention.

In another embodiment, the thicknesses of the respective layers may be as shown in FIG. 2, wherein the substrate 24 is shown to have first deposited thereon a primer layer 26, such as a suboxide of titanium as having a thickness of approximately 3 nm. On top of the primer layer 26 is then deposited a reflecting layer 28 such as the 30 nm thick layer of aluminum shown in FIG. 1. An optical spacer layer 30 overlying the reflecting layer 28 may also be an acrylate polymer but in this embodiment has a thickness of only approximately 30 nm. Finally, like that of the example of FIG. 1, the light-absorbing layer 32 may again be a thin film of HfC having a thickness of approximately 8.5 nanometers.

As shown in both FIGS. 1 and 2, the respective thicknesses of the optical spacer layer and the light absorbing layer are desirably tailored such that in combination the effective optical thickness possesses substantially interferometric properties resulting in an antireflecting structure which exhibits maximum optical absorption at a given wavelength. In the particular embodiment shown in FIG. 1, the thickness of the optical spacer layer 16 has been adjusted relative to that of the absorbing layer 18 so as to exhibit reflection minimum at 520 and 1560 nm so as to provide optimum sensitivity for recording wavelenths in the range of 480–500 nm. In contrast, the relative dimensions of the spacer and absorber layers shown in FIG. 2 are such as to exhibit a reflection minimum at approximately 500 nm thus obtaining optimum sensitivity for similar exposure wavelengths. In both cases, the effective optical thickness obtained by those layers in combination is selected so as to provide minimum reflectance and hence maximum absorption at an incident wave length of approximately 500 nm. In the event other incident wavelengths are employed, such as approximately 800 nm light provided by typical laser diodes, the relative thicknesses would be appropriately modified.

Figure 3:
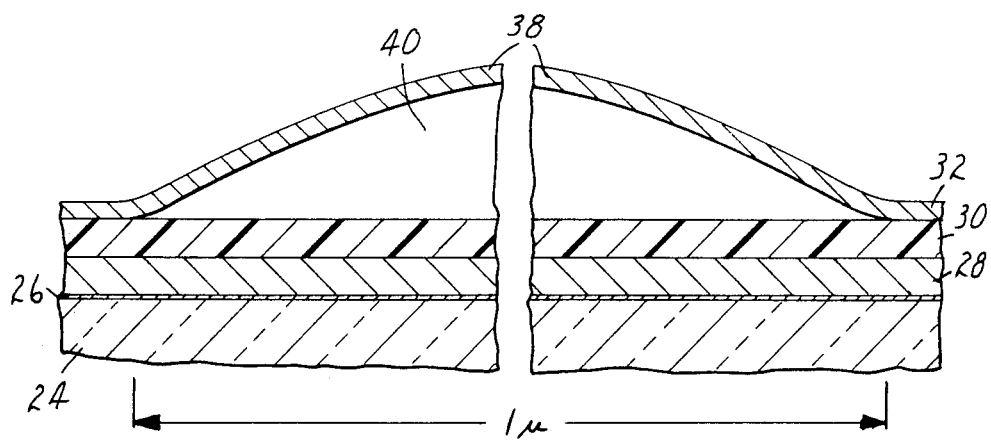
FIG. 3 is a cross-section of the recording medium of FIG. 2, showing a protuberance formed therein.

In contrast to the media described in the previously acknowledged references, the medium of the present invention preferably utilizes a light absorbing layer of one of the previously specified carbides sufficiently thin to have a degree of plasticity sufficient to allow deformation upon localized heating due to an impinging laser beam. This in turn enables the formation of a protuberance or bubble upon exposure to a localized, focused laser beam, as opposed to the formation of pits or holes. This action is shown in FIG. 3, wherein a medium like that of FIG. 2 has been thus exposed and caused to form a protuberance 38 such that it separates from the optical spacer layer 30 forming a gas filled zone 40 therebetween. As further shown in FIG. 3, the horizontal dimensions of the protuberance 38 may typically have dimensions on the order of 1 micron. FIG. 3 thus shows the relative dimensions of the respective layers in scale, while the center portion of the protuberance is cut away.

The selection of the specific carbide layer and exposure conditions so as to form protuberances is particularly desirable, in that the protuberances are readily optically detectable. Where the media are constructed to have antireflecting interferometric dimensions, the resultant protuberances destroy the antireflecting characteristics. In particular, for incident wavelengths in the range 480–500 nm, the peaks are desirably of a height, such as the approximate height of 120 nm shown in FIG. 3, i.e. $\lambda/4$. Accordingly, not only is the reflection minimum normally obtained in the undeformed regions destroyed, but an interferometric reflection maximum is obtained at the peak of the protuberance, thus resulting in an optimally high carrier-to-noise ratio between the undeformed and protuberant regions.

A high carrier-to-noise ratio has thus been found to be particularly characteristic of media of the present invention. When configured and when exposed under conditions causing the formation of protuberances of optimum height, the C/N typically observed is 10 to 15 dB greater than observed for media in which pits or holes are formed under the same exposure conditions.

As noted above, the formation of the protuberances is believed due to the generation of gas at the interface at the lower surface of the light absorbing layer. Thus the optical spacer layer preferably provided below the absorbing layer is selected of a material which readily releases gas upon localized heating. Desirable materials thus selected for that layer include organic materials such as an acrylate polymer, polystyrene, and like materials which may be deposited or applied in a variety of methods as set forth in the Examples hereafter. While polymeric materials are preferred for their low conductivity and low heat capacity and for their ability to readily release gas at low temperatures, it is similarly appreciated that various inorganic materials may be used. For example, deposited layers of Al and $SiO_2$ have been found to be a satisfactory gas provider. Such layers may contain sufficient amounts of chemi- or physi-absorbed substances on the surface which may be converted to gas upon localized heating.

Regardless of the specific materials from which the spacer layer is constructed, it is further appreciated that the spacer layer may be transparent so as to maximize reflection from the underlying reflectorized layer, or alternatively, may be dyed to promote absorption of radiation passed through the absorbing layer within the spacer layer and thereby maximize the production of gaseous products therein.

The carbides selected as the refractory material in the light absorbing layer utilized in the media of the present invention are those having a high melting point. For the purpose of the present invention, such a material may be defined as one having a solid state at 1,700 Kelvin. Thus, if the refractory material does not actually melt, but rather, sublimes, the phrase "melting point" simply indicates the temperature at which the material no longer exists in the solid state. In contrast to such media, media of the prior art is typically required to melt at relatively low temperatures, the lower the better, in order that the material may be evaporated or ruptured to form the resultant pit or hole at as low a power level as possible. In the present invention, the refractory material is first deformed without melting, and it has been found that the higher the melting point thereof, the better, the highest melting point materials typically exhibiting the highest range of recording latitude. Moreover, such refractory materials typically exhibit a high degree of chemical stability. This is significant in that such media retain substantially the same degree of sensitivity over prolonged exposures, thus enabling subsequent recordings to be made over extended periods of time. Similarly, the optical characteristics of the media do not significantly change, such that the recorded information in the form of reflection maxima and minima remain substantially unchanged over extended periods of time and exposure.

It is desirable to promote the adhesion of the optical recording tri-layer construction to the substrate, while at the same time improving the environmental stability and uniformity of the resultant medium. For that purpose, a nucleation or adhesion promoting layer such as the layer 26 shown in FIGS. 2 and 3, are desirably provided. Such a layer prevents blotchy, non-uniform deposition of the recording materials which is often caused by non-uniform sticking coefficients due to imperfectly cleaned or non-uniform substrates.

A further desirable aspect of the present invention is that the recorded medium, wherein the information is recorded in the form of a plurality of protuberances formed on the outer surface, is directly replicable by placing the surface containing protuberances in contact with a polymeric material or precursor thereof to form replicas of the protuberance pattern on the surface of that polymeric material. In a preferred embodiment, such replicas are preferably made by roll-coating a bead of liquid resin on the surface bearing the protuberances and subsequently curing the resin in situ, after which the adhered resin layer is removed from the master surface.

It is further been found that the protuberances are sufficiently mechanically stable to enable the recorded media to be used as a master wherein the protuberant surface is directly impressed into a softened polymeric sheet. The resultant information bearing surface of the replica is thus characterized by dimples or recesses in the surface corresponding to the protuberances in the originally formed information record. If the replica is to be used in playback in a reflective mode, the surface may then desirably be coated with a thin metallic reflecting layer.

Figure 4:
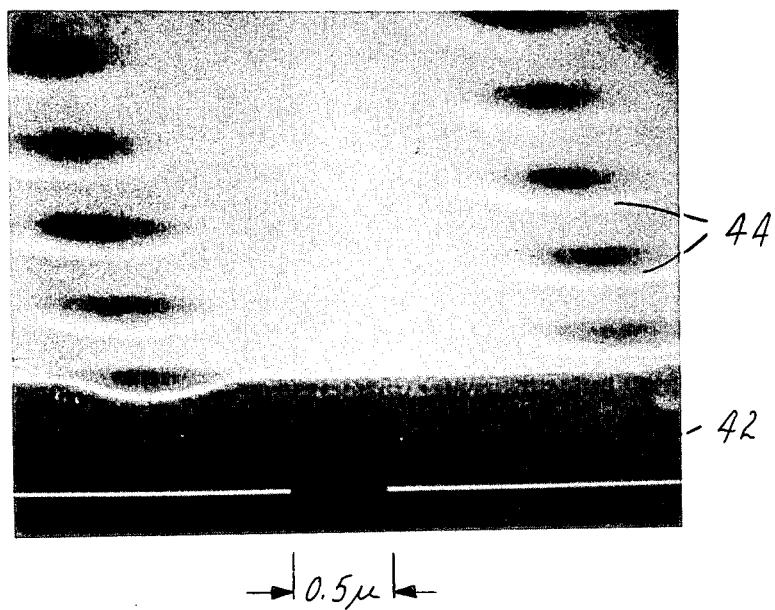
FIG. 4 is a scanning electron micrograph of a replica of a medium like that shown in FIGS. 2 and 3, wherein information was recorded therein as a series of protuberances along parallel tracks.

FIG. 4 is a scanning electron micrograph of a section of such a replica of the medium shown in FIGS. 2 and 3, formed of an acrylate resin 42 into which a plurality of protuberances were impressed to form the dimples 44, and on which a 20 nm gold film was sputtered to enable SEM. The replica was sectioned along the diameter of one of the dimples corresponding to a protuberance formed in the master information record. As may there be seen, the diameter of the resultant dimples is approximately 1 micron, and the depth therein, i.e. the height of the original protuberances, approximately 120 nm. It may there be noted that the dimples, like that of the original protuberances are characterized by a extremely smooth profile, thus providing a high carrier-to-noise ratio, as well as ensuring a high ease of replication.

While a trilayer construction, including a reflector, a spacer, and an absorbing layer so as to provide interferometric dimensions, may be preferred in certain embodiments, both bilayer and monolayer constructions may also be utilized. Thus, for example, a medium constructed according to the present invention may include a transparent substrate, a spacer or subbing layer and a light absorbing layer thereover. The incident radiation could then be directed through the substrate onto the spacer and absorber layers. An alternative bilayer construction may include a substrate having a reflectorized layer thereon and an absorber layer applied directly to the reflectorized layer. In this case the absorber layer is selected in view of its index of refraction and its equivalent optical thickness is tailored to provide dimensions for optimal sensitivity and carrier-to-noise ratio.

A further alternative construction of the medium of the present invention may also include a single absorbing layer applied directly to the substrate. As in the dual layer construction, such a layer is desirably selected to have an equivalent optical thickness so as to maximize sensitivity and carrier-to-noise ratio.

The optimum thickness of the light-absorbing layer varies depending upon the specific properties of the material selected, as well as upon the particular uses to be given to the resulting recording medium. Typically, such thicknesses are desirably maintained below 60 nm and above approximately 1 nm and are preferably in the range of 3–20 nm. If such layers exceed approximately 60 nm, such as being in the order of 100 nm, the bulk properties of the refractory materials begin to dominate, and the resultant medium becomes less sensitive. Further, the optical reflectivity from the surface increases to that associated with bulk materials, and the interferometric properties desirably obtained as the result of the combination of the absorbing layer and the spacer layer are lost, with an attendant decrease in sensitivity. On the other side of the thickness range, if the layer is less than three nm thick, optical absorption in the absorbing layer is reduced with an attendent decrease in sensitivity. Further, if the layer becomes less than approximately one nm thick, it would be difficult to assure that the layer would be continuous, i.e., free of discontinuities, and the layer becomes so fragile as to prevent the production of mechanically stable protuberances. In both extremes, the resultant carrier to noise ratio is significantly lower than that obtained within the desired ranges.

The present invention will be more readily understood by reference to the following examples. However, these examples are only illustrative in nature and are not to be construed to limit the scope of the invention.

Example 1

After cleaning a polymerically-subbed aluminum disk having a diameter of 30 cm, chromium sub-oxide was deposited by magnetically-assisted sputtering using a Cr target in an atmosphere of argon, water vapor and air. The sputtering was continued for about one to two minutes at a target current of about 500 mA and a background operating pressure of about $3 \times 10^{-3}$ Pa, thereby obtaining a nucleation/adhesion-promoting layer about 1–5 nm thick.

Over this, a reflecting layer of copper was applied by vacuum evaporation at a background pressure of about $10^{-4}$ Pa to a thickness of about 160 nm.

An RF plasma polymerization unit was then utilized to plasma-deposit a feed mixture of about 90 wt. % methylmethacrylate vapor and about 10 wt. % acrylic acid vapor was introduced at a mass flow rate of about $4 \times 10^{-4}$ g/sec., while argon was introduced at a mass flow rate of about $3 \times 10^{-5}$ g/sec. and a background operating pressure of about 10 Pa was maintained. A plasma polymerizing power of about 55 watts was utilized corresponding to a power density of about 3.8 kW/m$^3$ and a power flux of about 380 W/m$^2$. Deposition for about 10 minutes provided a poly-methylmethacrylate optical spacer layer about 100 nm in thickness.

Electron beam evaporation, with a beam voltage of about 10 kV and a beam current of about 0.11 A, was utilized to deposit a light-absorbing recording layer of HfC to a thickness of about 8.5 nm. Background operating pressure was about $7 \times 10^{-5}$ Pa. A deposition rate of 0.1 nm/sec. was achieved.

Recording experiments were performed on this trilayer medium rotating at 1800 rpm using a laser diode light source at about 820 nm with a 0.6 numerical aperture focusing lens incident upon the exposed surface of the light-absorbing layer. When a 10 MHz square wave signal was recorded at a radius of about 135 mm, using 50 ns pulses at an incident-light peak power level of 6.7 mW, a C/N ratio of 40 dB was achieved upon playback. Scanning electron microscope examination revealed the presence of well-defined protuberances or bubbles similar to the bubble 38 of the trilayer medium shown in FIG. 3 of the drawing.

Raising the incident-light peak power level to about 8.7 mW resulted in a C/N ratio of 50 dB. Scanning electron microscope examination revealed the presence of well defined protuberances or bubbles.

Bubbles also were produced at an incident-light peak power level of 10.0 mW.

Example 2

An optical recording medium was prepared as in Example 1 except that the light-absorbing layer was NbC and was deposited at a beam voltage of about 10 kV and a current of about 0.26 A to a thickness of about 8 nm.

When a square wave signal was dynamically recorded upon this medium as in Example 1, but at an incident light peak power level of 6.6 mW, a C/N ratio of 40 dB was achieved on playback. Raising the incident-light peak power level to 7.5 mW resulted in a C/N ratio of 50 dB. Scanning electron microscope examination revealed well-defined protuberances or bubbles.

Further raising the incident-light peak power level to 9.0 mW resulted in ablation of the light-absorbing layer and the generation of well-defined pits which had smooth edges and were free of irregularities and ablation debris.

Example 3

An optical recording medium was prepared as in Example 1 except that the light-absorbing layer was TaC and was deposited at a beam voltage of 10 kV and a beam current of 0.32 A to a thickness of about 6.6 nm.

When a square wave signal was dynamically recorded upon this medium as in Example 1, but at a radius of 105 mm and at an incident-light peak power level of 5.8 mW, a C/N ratio of 40 dB was achieved on playback. Raising the incident-light peak power level to 8 mW resulted in ablation of the light-absorbing layer and generation of pits.

Example 4

An optical recording medium was prepared as in Example 1 except that the light-absorbing layer was TiC and was deposited at a beam voltage of about 10 kV and a beam current of about 0.11 A to a thickness of about 7.5 nm.

When a square wave signal was dynamically recorded on this medium as in Example 1, but at an incident-light peak power level of 8.2 mW, a C/N ratio of 40 dB was achieved on playback. Raising the peak power level to 9.5 mW resulted in ablation of the light-absorbing layer and the generation of pits which had smooth edges and were free of irregularities and ablation debris.

While not specifically mentioned hereinabove, it is further appreciated that the recording medium of the present invention may be provided with a protective overcoat which is not destroyed during recording and which thus prevents dust, such as may be present either prior to the recording process or which may accumulate thereafter from degrading the carrier-to-noise ratio.

While the principles of the present invention have been demonstrated with particular regard to the Examples set forth above, it will be recognized that various departures may be undertaken in the practice of the invention. For example, the substrate itself may be formed organic or inorganic materials, and may be either of transparent materials, or formed of materials having a high reflectivity, thus eliminating the need for a separate reflecting layer underlying the absorptive layer. For another example, since wide band reflection is not required by the reflecting layer, the metal coating may be replaced by a multilayer (or even a single layer) dielectric reflector.

We claim:

1. An optical recording medium comprising a substrate and a light-absorbing layer having a thickness in the range of 1–60 nm in which information is recordable in the form of discrete features creatable by a focused, modulated laser beam, wherein the improvement comprises:

said light-absorbing layer comprising a refractory material formed of carbides of aluminum, hafnium, niobium, tantalum, titanium, vanadium, tungsten and zirconium and alloys therebetween.

2. A recording medium according to claim 1, further comprising a substantially transparent layer beneath the light-absorbing layer.

3. A recording medium according to claim 2, wherein said transparent layer is formed of a polymeric material.

4. A recording medium according to claim 2, wherein said transparent layer comprises the combination of a polymeric material and an organic dye such that greater than ten percent of light at a given wavelength is absorbed therein.

5. A recording medium according to claim 1, further comprising a reflecting layer between said substrate and said light-absorbing layer.

6. A recording medium according to claim 5, wherein said reflecting layer comprises a thin film of a material selected from the group consisting of aluminum, chromium, copper, gold, silver, stainless steels and titanium.

7. A recording medium according to claim 5, further comprising a primer layer between said substrate and said reflecting layer for enhancing the nucleation and adhesion of said reflecting layer.

8. A recording medium according to claim 7, wherein said primer layer comprises a thin film selected from the group consisting of an oxide or suboxide of chromium and titanium and alloys thereof.

9. A recording medium according to claim 5, further comprising an optical spacer layer between said reflecting layer and said light-absorbing layer.

10. A recording medium according to claim 9, wherein said light-absorbing layer and said spacer layer in combination have an effective optical thickness to provide a substantially interferometric antireflecting structure.

11. A recording medium according to claim 9, wherein said optical spacer layer comprises a substantially transparent film, and said light absorbing layer and said transparent optical spacer layer in combination have an effective optical thickness corresponding approximately to multiple interferometric orders so as to effect efficient light absorption during said laser beam impingement.

12. A recording medium according to claim 9 wherein said optical spacer layer comprises a material which readily provides a gas upon localized heating to enable the formation of protuberances upon impingement by said laser beam.

13. A recording medium according to claim 9, wherein said optical spacer layer is further characterized by low thermal conductivity and low heat capacity such that the impingement of said laser beam produces rapid localized heating with no appreciable heat dissipation within a time comparable to that during which said localized heating is produced, thereby enhancing the production of localized protuberances.

14. A recording medium according to claim 9, wherein said optical spacer layer comprises a spin cast polymeric layer.

15. A recording medium according to claim 9, wherein said optical spacer layer is formed of a polymeric material substantially transparent to said light.

16. A recording medium according to claim 9, wherein said optical spacer layer comprises the combination of a polymeric material and an organic dye such that greater than ten percent of light at a given wavelength is absorbed therein.

17. A recording medium according to claim 9, further comprising a primer layer between said substrate and said reflecting layer for enhancing the nucleation and adhesion of said reflecting layer.

18. A recording medium according to claim 1, having formed in the light-absorbing layer protuberances representing information.

19. A recording medium according to claim 1, having formed in the light-absorbing layer pits representing information.

* * * * *